United States Patent
Kawashima et al.

(10) Patent No.: US 7,123,468 B2
(45) Date of Patent: Oct. 17, 2006

(54) SOLID ELECTROLYTIC CAPACITOR AND PROCESS FOR PRODUCING THE SAME

(75) Inventors: Tomoko Kawashima, Osaka (JP); Yukifumi Takeda, Hyogo (JP); Kazuo Tadanobu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/534,284

(22) PCT Filed: Nov. 12, 2003

(86) PCT No.: PCT/JP03/14350

§ 371 (c)(1), (2), (4) Date: May 9, 2005

(87) PCT Pub. No.: WO2004/044936

PCT Pub. Date: May 27, 2004

(65) Prior Publication Data

US 2006/0109604 A1   May 25, 2006

(30) Foreign Application Priority Data

Nov. 13, 2002  (JP) .............................. 2002-329451

(51) Int. Cl.
*H01G 9/04*  (2006.01)
*H01G 9/145*  (2006.01)

(52) U.S. Cl. ...................... 361/532; 361/528; 29/25.03

(58) Field of Classification Search ................. 361/532, 361/523–528, 539, 540; 29/25.03
See application file for complete search history.

(56) References Cited

U.S. PATENT DOCUMENTS

| 5,005,107 | A |   | 4/1991 | Kobashi et al. |   |
|---|---|---|---|---|---|
| 5,071,521 | A | * | 12/1991 | Kojima et al. | 205/153 |
| 5,188,767 | A |   | 2/1993 | Yamazaki et al. |   |
| 5,223,120 | A | * | 6/1993 | Kojima et al. | 205/317 |
| 6,229,687 | B1 | * | 5/2001 | Wada et al. | 361/523 |
| 2003/0081373 | A1 | * | 5/2003 | Hamada et al. | 361/502 |

FOREIGN PATENT DOCUMENTS

| JP | 2-264415 |   | 10/1990 |
|---|---|---|---|
| JP | 4-218524 |   | 8/1992 |
| JP | 5-47610 |   | 2/1993 |
| JP | 5-159987 |   | 6/1993 |
| JP | 05159987 | A * | 6/1993 |

* cited by examiner

*Primary Examiner*—Eric W. Thomas
(74) *Attorney, Agent, or Firm*—McDermott Will & Emery LLP

(57) ABSTRACT

A solid electrolytic capacitor includes a valve metal on which surface a dielectric oxide film layer, a solid electrolyte layer, and a cathode layer are formed in this order. The cathode layer includes a silver layer which is formed of silver particles and at least one of phenolic novolak type epoxy resin represented by formula (1) and trishydroxyphenylmethane type epoxy resin represented by formula (2). Not less than 90 wt. % of the silver particles are occupied by flaky silver particles, which account for not less than 50 vol. % and not greater than 90 vol. %. This capacitor shows excellent characteristics in ESR and impedance.

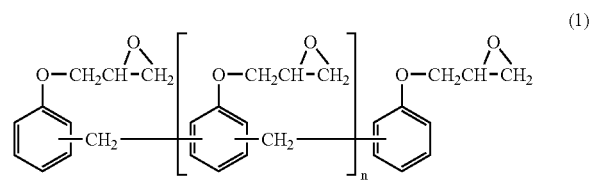
(1)
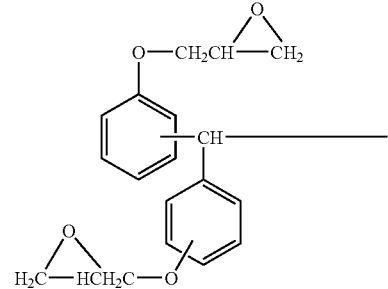
(2)
-continued
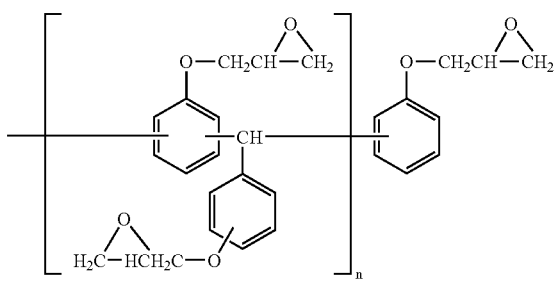
7 Claims, 4 Drawing Sheets

PRIOR ART

SOLID ELECTROLYTIC CAPACITOR AND PROCESS FOR PRODUCING THE SAME

This application is a U.S. national phase application of PCT international application PCT/JP2003/014350 filed Nov. 12, 2003.

TECHNICAL FIELD

The present invention relates to solid electrolytic capacitors and a process for producing the same capacitors.

BACKGROUND ART

Electronic devices have been digitized recently, and this market trend demands capacitors used in those devices to have a low impedance at a high frequency region and a greater capacity in a downsized body. In order to meet this demand, plastic-film capacitors, mica-capacitors, or laminated ceramic capacitors are used. Other than those capacitors, aluminum electrolytic capacitors, aluminum solid electrolytic capacitors, tantalum solid electrolytic capacitors are also used for meeting the foregoing demand.

An aluminum solid electrolytic capacitor is formed by this method: positive and negative electrodes etched and made of aluminum foil are wound up with a separator therebetween, and a liquid electrolyte is used. An aluminum solid electrolytic capacitor and a tantalum solid electrolytic capacitor aim to improve the capacitor properties at a high-frequency region. The electrolyte of those capacitors is made of solid electrolyte such as conductive polymer or manganese oxide; the conductive polymer is formed by polymerizing polymeric monomer such as pyrrole or thiophene derivatives. Those solid electrolytic capacitors have been developed and are now available in the market.

FIGS. 6A and 6B show structure of a capacitor element to be used in solid electrolytic capacitors. FIG. 6A shows a perspective view of the capacitor element and FIG. 6B shows a sectional view of the element shown in FIG. 6A taken along line 6B—6B. Valve metal 31 is roughened by etching process, and has anodic oxide film 32 (hereinafter referred to simply as "film") on its surface. Insulating tape 33 disposed on film 32 divides valve metal 31 into anode leader 31A and capacitor element section 31B. On the surface of film 32 of capacitor element section 31B, the following two layers are formed in this order: solid electrolyte layer 34 made of conductive polymer, and conductive layer 35 made of a carbon layer and a silver paste layer. Capacitor element 36 is thus constructed.

Anode leader 31A and conductive layer 35 are coupled to an anode terminal and a cathode terminal respectively (not shown). The whole capacitor element 36 is covered by an outer casing resin (not shown) formed by molding, so that a solid electrolytic capacitor is obtained.

An electrolytic oxidation polymerization method and a chemical oxidation polymerization method are known as methods of forming solid electrolyte layer 34. According to the former method, a manganese dioxide layer is formed in advance on film 32, and solid electrolyte layer 34 is formed on the manganese dioxide layer. According to the latter method, solid electrolyte layer 34 is formed on film 32 directly.

The carbon layer and the silver paste layer are formed by applying the respective pastes available in the market and drying them.

The prior art related to the present invention is Japanese Patent Application Unexamined Publication No. H05-159987.

The characteristics of the foregoing solid electrolytic capacitor largely depend on conductive layer 35 made of the carbon layer and the silver paste layer formed on the surface of solid electrolyte layer 34. In particular, material of silver particles of the silver paste layer, its particle shape, a ratio of resin material vs. silver particles affect an equivalent series resistance (hereinafter referred to as "ESR") of the capacitor characteristics.

However, optimization of the silver particles material and its particle shape as well as the ratio of the silver particles vs. epoxy resin (reactant of bisphenol A and epichlorohydrin) available in the market cannot achieve a capacitor that satisfies the characteristics in a high frequency region needed for the digitization of electronic devices.

An interface resistance between the carbon layer and the silver paste layer becomes high depending on a surface condition of solid electrolyte layer 34, so that the ESR of the capacitor becomes high.

DISCLOSURE OF INVENTION

A solid electrolytic capacitor of the present invention has a valve metal and, formed on a surface of the metal in this order: a dielectric oxide film layer, a solid electrolyte layer, and a cathode layer. A part of the cathode layer has a silver layer, which includes silver particles and at least either of phenolic novolak type epoxy resin represented by formula (1) and trishydroxyphenylmethane type epoxy resin represented by formula (2). At least 90 wt. % of the silver particles are flaky, and the flaky particles account for 50 to 90 vol. %.

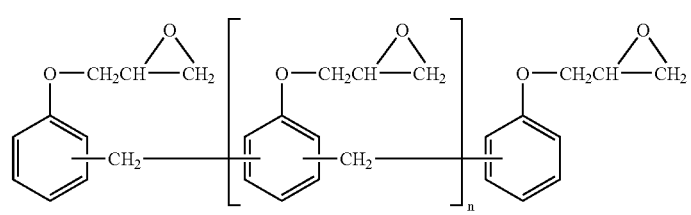

(1)

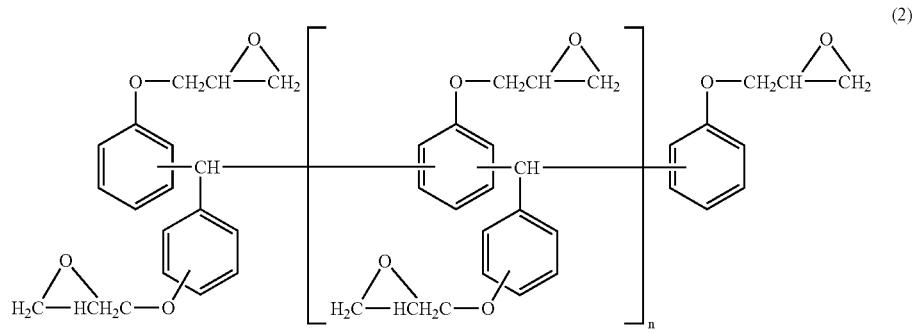

DETAILED DESCRIPTION OF PREFERRED EMBODIMENTS

Exemplary embodiments of the present invention are demonstrated hereinafter. Similar elements to those in the respective embodiments have the same reference marks and detailed description thereof is omitted.

First Exemplary Embodiment

Figure 1:
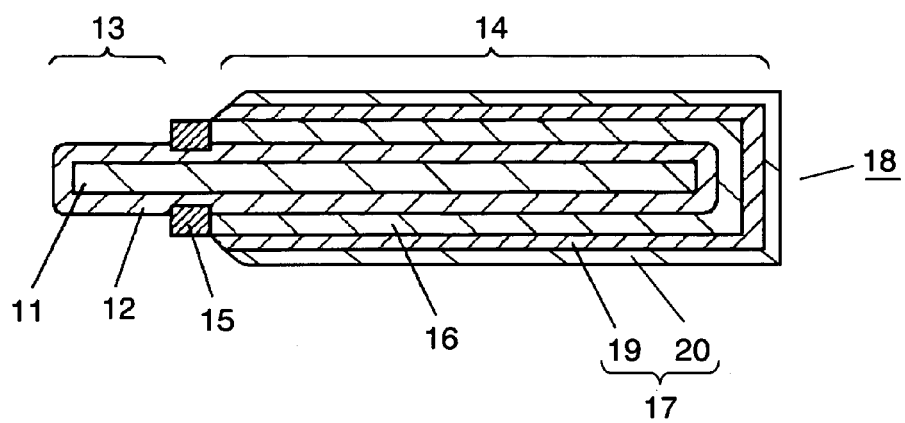
FIG. 1 shows a sectional view illustrating a structure of a capacitor element of a solid electrolytic capacitor in accordance with exemplary embodiments of the present invention.

FIG. 1 shows a sectional view illustrating a structure of a capacitor element of a solid electrolytic capacitor in accordance with the first exemplary embodiment of the present invention. Aluminum foil 11 undergoes a surface roughening process, and a dielectric oxide film layer 12 (hereinafter referred to simply as "film") is formed thereon. Insulating layer 15 divides foil 11 into anode section 13 and cathode section 14. In cathode section 14, solid electrolyte layer 16 and cathode layer 17 are formed in this order, thereby forming capacitor element 18. Layer 16 can be a single layer or plural layers. Cathode layer 17 is formed of carbon layer 19 and silver layer 20.

Anode section 13 and cathode section 17 are coupled to respective terminals (not shown) for outer devices. An outer casing resin (not shown) covers capacitor element 18 with the respective terminals exposed partially. A solid electrolytic capacitor is thus obtained.

To be more specific, the solid electrolytic capacitor is constructed in the following way:

In sample Group 1, first, a surface of foil 11 of 10 μm thickness is roughened by etching in an electric chemical way, then foil 11 having undergone the surface roughening is dipped into water solution of 3% ammonium adipate. Then foil 11 undergoes anodic oxidation by being applied a voltage of 12V for 60 minutes at 70° C. in the water solution, so that film 12 is formed.

Next, foil 11 on which film 12 is formed is shaped into a belt-like form having a width of 6 mm, and insulating layer 15 made of polyimide resin tape is stuck to foil 11 in order to divide the surface of foil 11 into anode section 13 and cathode section 14.

Cathode section 14 is press-molded into a comb-like shape, and a comb-like shaped cross section of foil 11 undergoes a chemical treatment similar to that used to electrode foils of aluminum electrolytic capacitors.

Next, cathode section 14 is dipped into water solution of 30% manganese nitrate, and undergoes air-drying before it undergoes heat decomposition at 300° C. for 10 minutes, so that a manganese oxide layer as a conductive layer (not shown) is formed. This layer is a part of the solid electrolyte layer.

Polymerizing liquid for forming the solid electrolyte layer is prepared next. Pyrrole monomer 0.5 mol/L and sodium propylnaphthalene-sulfonate 0.1 mol/L are mixed in advance. Water as solvent and propyl-phosphate ester as pH adjuster are added to the foregoing mixture, so that pH of the mixture is adjusted to 2. Cathode section 14 is dipped into this polymerizing liquid, and an electrode for starting polymerization is placed close to the surface of cathode section 14, so that electrolytic oxidizing polymerization starts. Solid electrolyte layer 16 made of conductive polymer is thus formed on the surface of the conductive layer.

Then, Colloidal carbon suspension is applied and dried, so that carbon layer 19 is formed, and silver paste is applied and dried, so that silver layer 20 is formed to be cathode layer 17. Silver layer 20 is formed by dipping into silver paste before heat treatment at 200° C. for 10 minutes is provided.

Belt-like foil 11 is punched so that anode section 13 can be obtained, thereby producing capacitor element 18.

Capacitor elements 18 are laminated, and a terminal for an outer device is coupled to anode sections 13 of the laminated body. Another terminal is coupled to cathode layers 17, and outer casing resin, made of e.g. epoxy resin, covers laminated elements 18 with the terminals partially exposed, so that a solid electrolytic capacitor is obtained. This capacitor is rated at 6.3V and 10 μF.

The silver paste forming of silver layer 20 has dispersion of particle diameters ranging from 0.1 μm to 30 μm (average diameter; 4 μm) and includes flaky silver particles of which dimension, in terms of a ratio of vertical length vs. horizontal length, disperses from 1:2 to 1:10. This silver paste includes phenolic novolak type epoxy resin represented by formula (1), hydroquinone diglycidyl ether as curing agent, and ethylene glycol monobutyl ether as diluting agent. When those materials are mixed, a mixing ratio of silver particles vs. phenolic novolak type epoxy resin is changed so that the silver particles can occupy the volume at 40, 50, 60, 70, 80, 90, and 95%.

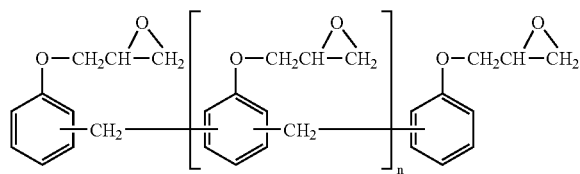
(1)

Next, sample Group 2 is described hereinafter. In sample group 2, trishydroxyphenylmethane type epoxy resin represented by formula (2) is used as material of the silver paste instead of phenolic novolak type epoxy resin used in sample group 1. Other materials remain unchanged from those of sample group 1, and the volume occupation of the flaky silver particles is varied for producing solid electrolytic capacitors as same as sample group 1.

methylhydrophthalic anhydride, polyphenolic material such as phenolic novolak type epoxy resin, or amine-based compound such as imidazole, dicyandiamide, is used. As diluting agent, alcohol-based solvent, cellosolve-based solvent, carbitol-based solvent, ester-based solvent, or ketone-based solvent can be used.

Figure 2:
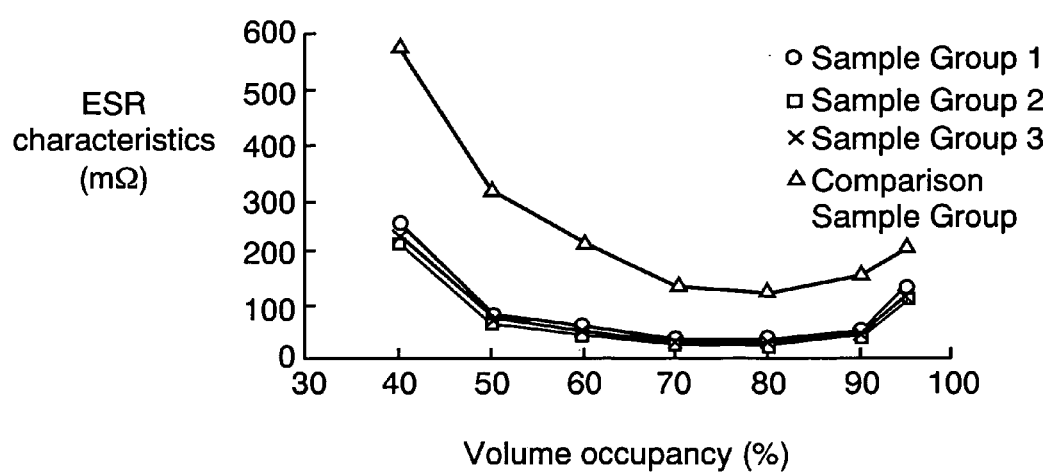
FIG. 2 shows characteristics illustrating a relation between a volume occupied by flaky silver particles included in a silver layer and ESR characteristics of the solid electrolytic capacitor in accordance with a first exemplary embodiment of the present invention.

FIG. 2 shows ESR characteristics measured at 100 kHz of the solid electrolytic capacitors immediately after being produced according to the methods of foregoing sample groups 1, 2 and 3. ESR characteristics of a solid electrolytic capacitor of another sample group for comparison purpose are listed in FIG. 2. This capacitor uses bisphenol A type epoxy resin instead of phenolic novolak type epoxy resin used in sample group 1.

As FIG. 2 tells, the solid electrolytic capacitors of sample groups 1–3, of which volume occupancy of the flaky silver particles in silver layer ranges from 50 to 90%, are excellent in ESR characteristics, namely, not more than 100 mΩ. On the other hand, capacitors of which volume occupancy of flaky particles is less than 50% or exceeds 90% are poor in ESR characteristics. The reason is this: in the case of the volume occupancy less than 50%, a resistant value of silver layer 20 increases, and in the case of the volume occupancy exceeding 90%, bonding strength between silver layer 20 and solid electrolyte layer 16 becomes weak.

The solid electrolytic capacitor of the comparison sample group finds better ESR characteristics at the volume occupancy ranging from 80 to 90%; however, they are still poorer than those of sample groups 1–3.

The Phenolic novolak type epoxy resin represented by formula (1) and the trishydroxyphenylmethane type epoxy resin represented by formula (2) have a plurality of reacting groups while conventional epoxy resin has a single group. Therefore, they produce greater stress at their curing, so that a contact pressure between the resin and the flaky silver particles increases. The resistant value of silver layer 20 is thus reduced, and adherence of silver layer 20 to solid electrolyte layer 16 or other sections of cathode layer 17 improves.

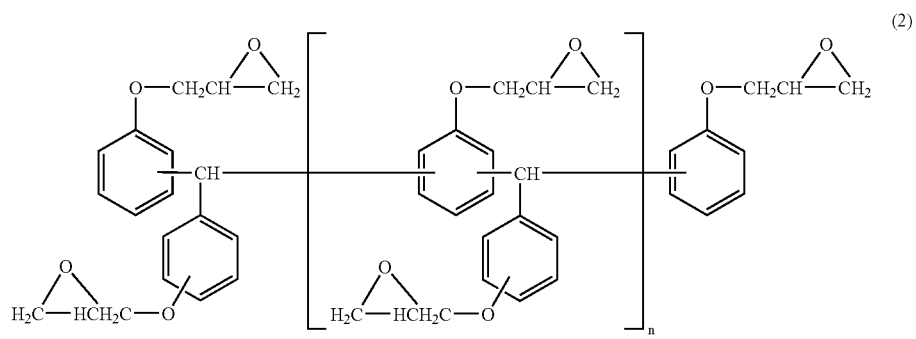
(2)

Next, sample Group 3 is described hereinafter. In sample group 3, phenolic novolak type epoxy resin represented by formula (1) and trishydroxyphenylmethane type epoxy resin represented by formula (2) are used at a compounding ratio of 50:50 as material of the silver paste forming silver layer 20. Other materials remain unchanged from those in sample group 1, and the volume occupation of the flaky silver particles is varied for producing solid electrolytic capacitors as same as sample group 1.

The silver paste includes curing agent and diluting agent in addition to the epoxy resins represented by formulae (1) and (2). Curing accelerator or coupling agent can be used if necessary. As curing agent, hexahydrophthalic anhydride, Silver paste formed of the mixture of flaky silver particles and spherical silver particles is prepared as sample group 4. The ratios of flaky silver particles vs. spherical silver particles in the mixture are 80:20, 85:15, 90:10, 95:5, and 100:0. Other materials remain unchanged from those of sample group 1, and solid electrolytic capacitors of sample group 4 are thus produced. The case where mixture ratio is 100:0 is as same as one of sample group 1. Volume occupancy of silver particles in silver layer 20 is set to 80%. An average particle diameter of the spherical silver particles is 4 μm.

Figure 3:
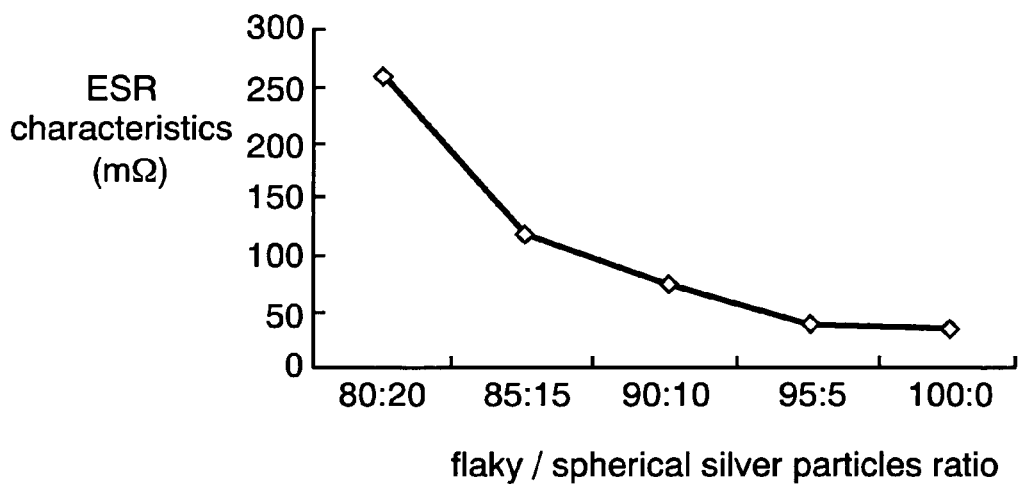
FIG. 3 shows characteristics illustrating a relation between a ratio of flaky silver particles vs. spherical particles and ESR characteristics of the solid electrolytic capacitor in accordance with the first exemplary embodiment of the present invention.

FIG. 3 shows ESR characteristics measured at 100 kHz of the solid electrolytic capacitor immediately after produced in accordance with sample group 4. As FIG. 3 tells, when an amount of flaky silver particles is at least 90 wt. %, the ESR characteristics of this capacitor lowers to not more than 100 mΩ. When an amount of the flaky silver particles is less than 90 wt. %, a resistant value of silver layer 20 increases, so that the ESR becomes high.

The foregoing discussion concludes that a solid electrolytic capacitor excellent in ESR characteristics and impedance characteristics can be obtained when the following conditions are satisfied: silver layer 20 includes the epoxy resins represented by formulae (1) and (2); an amount of flaky silver particles is not less than 90 wt. % in silver particles; and a volume occupancy of the flaky silver particles falls within 50–90%.

The flaky silver particles of which diameters disperse from 0.1 to 30 μm and of which average particle diameter is 4 μm are used; however, the particles of which average particle diameter ranges from 1–10 μm also produce an advantage similar to what is discussed as above. It is more preferable to use particles of which average diameter ranges from 3 to 8 μm. If a particle diameter of the flaky silver particles in silver layer 20 falls outside the range of 0.1–30 μm, silver particles agglomerate, or poorly contact with each other, so that a resistant value of silver layer 20 increases.

It is preferable that the flaky shape of silver particles should be this: the longitudinal length of a flat section ranges from two to ten times of the thickness thereof. Use of the flaky silver particles falling within this range further lowers the resistant value of silver layer 20. If the longitudinal length is less than two times of the thickness, silver particles contact with each other at point-to-point, so that the resistant value of silver layer 20 increases. If the longitudinal length exceeds ten times of the thickness, the mixture in the silver paste becomes uneven and the bonding strength of silver layer 20 weakens. The resistant value of layer 20 as a whole thus increases.

In the present embodiment, cathode layer 17 is formed of silver layer 20 and carbon layer 19. It is preferable for carbon layer 19 to use carbons of which particle diameter is not greater than 5 μm. Cathode layer 17 can be formed of only silver layer 20.

Second Exemplary Embodiment

In the second embodiment, the silver paste, of which flaky silver particles occupy 80 vol. % of silver layer 20, is used. Heat treatment temperature after forming silver layer 20 is set between 160–250° C. in steps of 10° C. Other conditions remain unchanged from those of sample group 1 in the first embodiment, and solid electrolytic capacitors of sample group 5 are thus produced. The capacitor having undergone the heat treatment at 200° C. is equal to the one of sample group 1.

Figure 4:
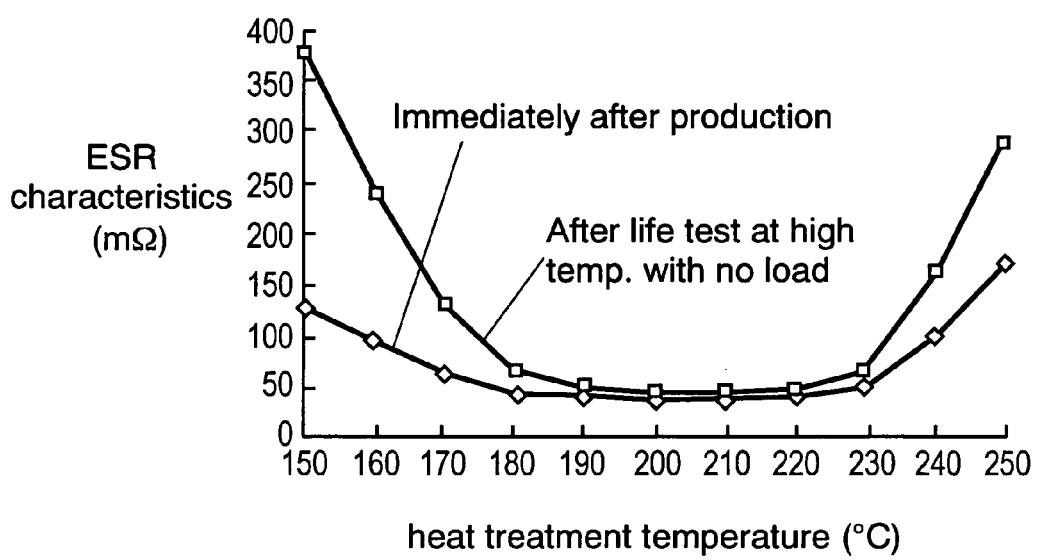
FIG. 4 shows characteristics illustrating a relation between a curing temperature of a silver layer and ESR characteristics of the solid electrolytic capacitor in accordance with a second exemplary embodiment of the present invention.
Figure 5:
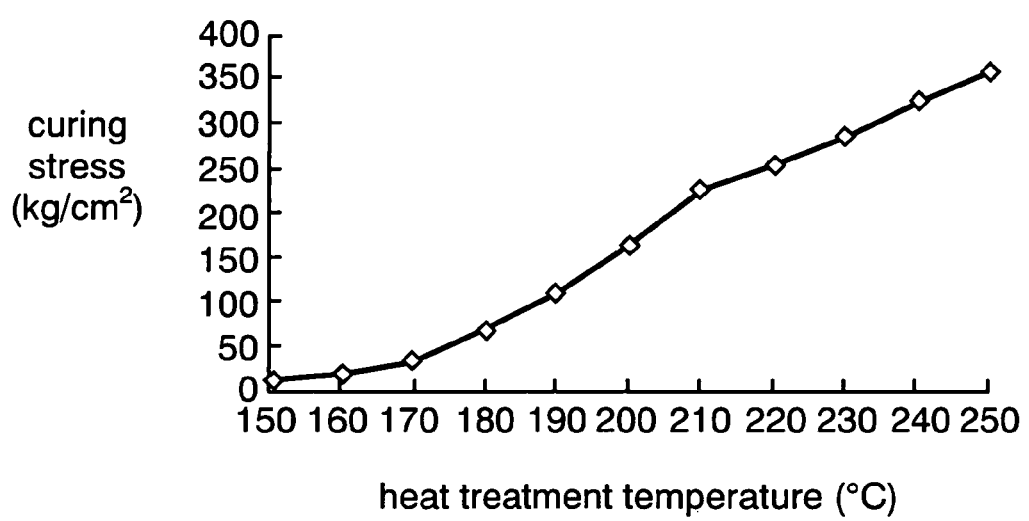
FIG. 5 shows characteristics illustrating a relation between a heat treatment temperature of silver paste and curing stress of the silver layer in accordance with the second exemplary embodiment of the present invention.
Figure 6A:
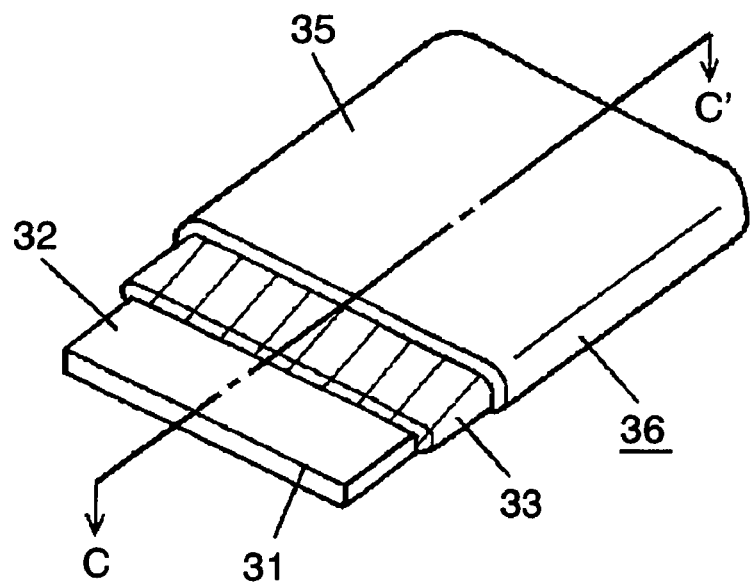
FIG. 6A shows a perspective view illustrating a structure of a capacitor element of a conventional solid electrolytic capacitor.
Figure 6B:
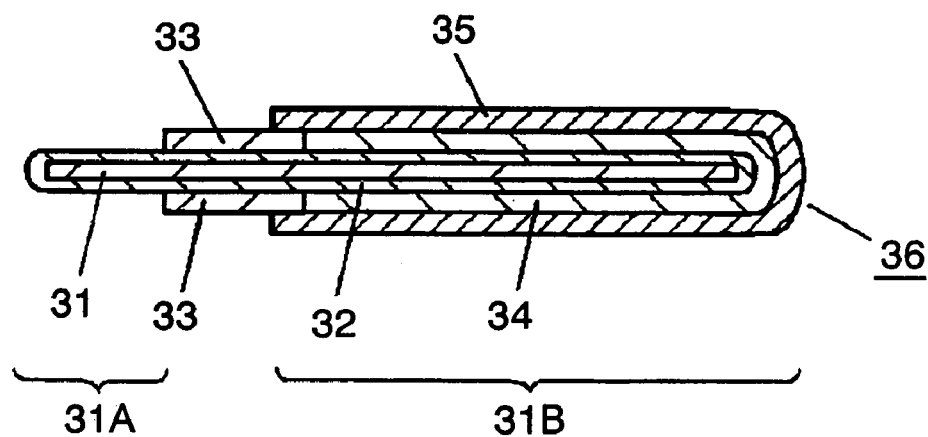
FIG. 6B shows a sectional view of the capacitor element shown in FIG. 6A.

FIG. 4 shows ESR characteristics measured at 100 kHz immediately after the production of the solid electrolytic capacitors in accordance with the present embodiment and measured at 100 kHz of the same after 500 hours at 105° C. with no load. FIG. 5 shows the measurement of curing stress of the silver paste. The curing stress means contraction stress produced in curing of the silver paste applied and having undergone the heat treatment. The curing stress can be found by this method: the silver paste is applied onto cover glass having a given thickness, and the glass undergoes heat treatment. Then warp of the cover glass is measured for calculating the curing stress.

As FIG. 4 tells, the capacitors having undergone the heat treatment at 180–230° C. show low ESR characteristics, this is shown by both the capacitors measured immediately after the production and left at a high temperature with no load. The capacitors out of this temperature range show an increase in ESR characteristics.

As FIG. 5 tells, the curing stress of the silver paste depends on heat treatment temperature. Heat treatment at lower than 180° C. makes curing stress lower than 50 kg/cm² and bonding strength between the flaky silver particles and epoxy resin weak, so that ESR characteristics become poor. On the other hand, heat treatment over 230° C. makes curing stress higher than 300 kg/cm²; however, cracks occur in silver layer 20 or silver layer 20 peels off when it is left at a high temperature, so that ESR characteristics become high. Detailed studies have found that excellent ESR characteristics are obtainable when the curing stress falls within the range from 50 kg/cm² to 300 kg/cm².

The foregoing discussion concludes that it is preferable to set a heat treatment temperature between 180–230° C. in order to lower a contact resistance by bonding flaky silver particles with epoxy resin and also lower the resistant value of silver layer 20.

Third Exemplary Embodiment

Sample 6 of the third embodiment is described first. In sample 6, cathode section 14 is dipped into water solution of 5% soluble aniline, dried in air before it undergoes heat treatment at 200° C. for 5 minutes. This preparation produces a conductive polymer layer (not shown) which is a part of a solid electrolyte layer. This polymer layer corresponds to the manganese oxide layer used in sample group 1 in the first embodiment. Then pyrrole monomer 0.2 mol/L and naphthalensulfonate derivative 0.1 mol/L are dissolved into solvent formed by mixing water and propyl alcohol, thereby producing polymerizing liquid to be used for forming the solid electrolyte. In this polymerizing liquid, an electrode for starting polymerization is placed close to the surface of cathode section 14, and electrolytic polymerization is carried out at a polymerization voltage of 1.5V. Solid electrolyte layer 16 having an average surface roughness of 3.8 μm is thus formed. Other conditions and materials remain unchanged from those of the first embodiment, so that a solid electrolytic capacitor is produced in a way similar to that of sample group 1.

Next, sample 7 is described hereinafter. In sample 7, instead of the polymerizing liquid used in sample group 1, thiophene monomer 0.05 mol/L and naphthalensulfonate derivative 0.03 mol/L are dissolved into solvent formed by mixing water and ethanol, thereby producing polymerizing liquid to be used for forming the solid electrolyte. In this polymerizing liquid, an electrode for starting polymerization is placed close to the surface of cathode section 14, and electrolytic polymerization is carried out at a polymerization voltage of 1.5V Other conditions and materials remain unchanged from those of the first embodiment, so that a solid electrolytic capacitor is produced in a way similar to that of sample group 1. Sample 7 thus produced has solid electrolyte layer 16 having an average surface roughness of 0.1 μm.

Next, sample 8 is described hereinafter. In sample 8, instead of the polymerizing liquid used in sample 7, ethylene-dioxythiophene monomer 0.1 mol/L and naphthalensulfonate derivative 0.05 mol/L are dissolved into solvent formed by mixing water and propyl alcohol, thereby producing polymerizing liquid to be used for forming the solid electrolyte. In this polymerizing liquid, an electrode for starting polymerization is placed close to the surface of cathode section 14, and electrolytic polymerization is carried out at a polymerization voltage of 4V. Other conditions and materials remain unchanged from those of sample 7, so that a solid electrolytic capacitor is produced. Sample 8 has solid electrolyte layer 16 of which average surface roughness is 30.0 μm Next, sample 9 is described hereinafter. In sample 9, solid electrolyte layer 16 having an average surface roughness of 2.1 μm is produced in the following manner: cathode section 14 is dipped into water solution of 30% manganese nitrate, then dried in air before it undergoes heat treatment at 300° C. for 10 minutes. This set of the treatment is repeated 15 times, so that a manganese oxide layer is produced as solid electrolyte layer 16. Other conditions and materials remain unchanged from those of sample group 1 used in the first embodiment, so that a solid electrolytic capacitor is produced.

Next, sample 10 is described hereinafter. In sample 10, solid electrolyte layer 16 having an average surface roughness of 3.5 μm is produced in the same manner as sample 6. In the production, cathode section 14 is dipped into water solution of 5% soluble aniline, then dried in air. Cathode section 14 then undergoes heat treatment at 210° C. for 3 minutes, so that a conductive polymer layer (not shown), which is a part of the solid electrolyte layer, is formed. In the electrolytic polymerization following the formation of polymer layer, after-mentioned polymerizing liquid to be used for forming the solid electrolyte is used. The polymerizing liquid is formed in this way: pyrrole monomer 0.1 mol/L and naphthalensulfonate derivative 0.1 mol/L are dissolved into solvent formed by mixing water and propyl alcohol. Other conditions and materials remain unchanged from those of sample 6, so that a solid electrolytic capacitor is produced.

Next, sample 11 is described hereinafter. In sample 11, solid electrolyte layer 16 having an average surface roughness of 32.5 μm is produced in the following manner: First, a conductive polymer layer (not shown), which is a part of the solid electrolyte layer, is formed in the same manner as sample 10 is formed. Other conditions and materials remain unchanged from those of sample 8, so that a solid electrolytic capacitor is produced.

Next, sample 12 is described hereinafter. In sample 12, solid electrolyte layer 16 having an average surface roughness of 12.5 μm is produced in the following manner: cathode section 14 is dipped into water-alcohol solution, in which 1.0% of polyethylene dioxy thiophene polystylene sulfonic acid including binder and 1.0% of sulfonated polyaniline are dissolved, then pulled up. Cathode section 14 then undergoes a drying process at 150° C. for 5 minutes. As a result, polyethylene dioxy thiophene polystylene sulfonate layer is formed. Then cathode section 14 is dipped into ethylene dioxy thiopene (heterocyclic monomer) solution, and pulled up. This solution is mixed solution including 1(one) part of ethylene dioxy thiophene as heterocyclic monomer, 2 parts of ferric iron p-toluenesulfonate as oxidizing agent, and 4 parts of n-butanol as polymerization solvent. Then cathode section 14 is left at 85° C. for 60 minutes, so that solid electrolyte layer 16 formed of polyethylene dioxy thiophene, conductive polymer via chemical polymerization, is formed. Other conditions and materials remain unchanged from those of sample group 1 used in the first embodiment. A solid electrolytic capacitor is thus produced.

Samples 6–12 employ silver layer 20 in which flaky silver particles occupying 80% volume in silver paste is used. Table 1 shows structures of the solid electrolyte layers in samples 6–12.

TABLE 1

| | Solid Electrolyte Layer |
|---|---|
| Sample 6 | polyaniline/polypyrrole |
| Sample 7 | manganese oxides/polythiophene |
| Sample 8 | manganese oxides/polyethylene dioxy thiophene |
| Sample 9 | Manganese oxides |
| Sample 10 | polyaniline/polypyrrole |
| Sample 11 | polyaniline/polyethylene dioxy thiophene |

TABLE 1-continued

| | Solid Electrolyte Layer |
|---|---|
| Sample 12 | polyethylene dioxy thiophene polystylene sulfonate/polyethylene dioxy thiophene |

Table 2 shows ESR characteristics of samples 6–12, measured at initial stages of each sample, and after life test at 105° C. for 500 hours with no load, both at 100 kHz.

TABLE 2

| | ESR characteristics (mΩ) | | |
|---|---|---|---|
| | Right after Production | Life test at high Temp. | average surface roughness (μm) |
| Sample 6 | 35 | 52 | 3.8 |
| Sample 7 | 48 | 66 | 0.1 |
| Sample 8 | 47 | 69 | 30.0 |
| Sample 9 | 53 | 73 | 2.1 |
| Sample 10 | 49 | 71 | 3.5 |
| Sample 11 | 89 | 106 | 32.5 |
| Sample 12 | 56 | 83 | 12.5 |

Table 2 tells that use of thiophene, aniline, furan, or their derivatives, or manganese oxides other than pyrrole in solid electrolyte layer 16 produces ESR characteristics similar to those of the first embodiment. Use of such materials in solid electrolyte layer 16 produces solid electrolytic capacitors excellent in ESR characteristics and impedance characteristics.

Use of an average surface roughness ranging from not less than 0.1 μm to not greater than 30 μm increases contact areas between solid electrolyte layer 16 and silver layer 20 and decreases interface resistance, so that ESR characteristics and impedance characteristics improve.

In the foregoing embodiments, the valve metal of aluminum is used as an anode in the solid electrolytic capacitors; however, other valve metals such as tantalum, niobium, or titanium coated by oxide film can be used with an advantage similar to what is discussed above.

INDUSTRIAL APPLICABILITY

In the solid electrolytic capacitor of the present invention, a dielectric oxide film layer, a solid electrolyte layer, and a cathode layer are formed in this order on the surface of a valve metal. A part of the cathode layer is formed of a silver layer which includes silver particles, and at least one of phenolic novolak type epoxy resin represented by formula (1), and a trishydroxyphenylmethane type epoxy resin represented by formula (2). Not less than 90 wt. % of the silver particles are occupied by flaky silver particles, and a volume occupancy of the flaky silver particles falls within 50–90 vol. %. Phenolic novolak type epoxy resin represented by formula (1) and trishydroxyphenylmethane type epoxy resin represented by formula (2) are more excellent in shrink characteristics in curing than that of conventional epoxy resin. The contact pressure between the resin and the flaky silver particles thus increases, and a resistant value of the silver layer decreases. Because the foregoing resins have plural reacting groups, adherence to the solid electrolyte layer or the other part of the cathode layer improves. As a result, solid electrolytic capacitors excellent in ESR characteristics and impedance characteristics are obtainable. As discussed above, the present invention relates to solid electrolytic capacitors and a process for producing the same capacitors, and allows achieving a solid electrolytic capacitor which has a greater capacity in downsized body in accordance with a request from the market, and lowering its impedance in a high-frequency region.

The invention claimed is:

1. A solid electrolytic capacitor comprising:
   a valve metal;
   a dielectric oxide film layer disposed on a surface of the valve metal;
   a solid electrolyte layer disposed on a surface of the dielectric oxide film layer; and
   a cathode layer disposed on a surface of the solid electrolytic capacitor and having a silver layer which includes silver particles, and at least one of phenolic novolak type epoxy resin represented by formula (1) and trishydroxyphenylmethane type epoxy resin represented by formula (2), and not less than 90 wt. % of the silver particles being occupied by flaky silver particles, and the flaky silver particles occupying not less than 50 vol. % and not greater than 90 vol. % of the silver layer.

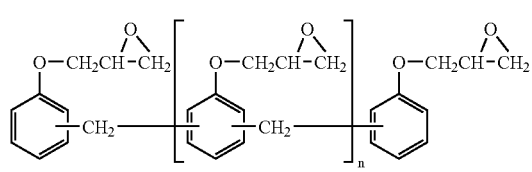

(1)

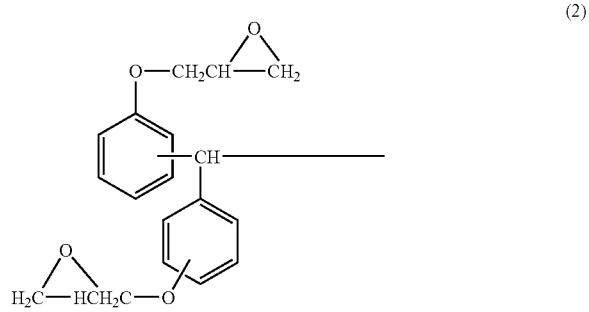

(2)

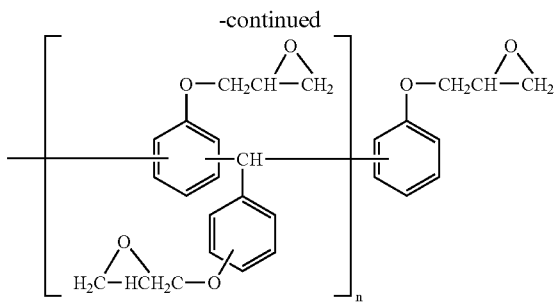

-continued

2. The solid electrolytic capacitor of claim 1, wherein a particle diameter of the flaky silver particles is not smaller than 0.1 μm and not greater than 30 μm, and a longitudinal length of a flat section of one of the flaky particles is not shorter than 2 times and not longer than 10 times of a thickness of the flat section of one of the flaky silver particles.

3. The solid electrolytic capacitor of claim 1, wherein the solid electrolyte layer has an average surface roughness of not smaller than 0.1 μm and not greater than 30 μm.

4. The solid electrolytic capacitor of claim 1, wherein the solid electrolyte layer includes at least one of manganese oxide and conductive polymer of which basic skeleton is one of pyrrole, thiophene, aniline, furan, and derivatives thereof.

5. A process for producing a solid electrolytic capacitor, the process comprising the steps of:
   forming a dielectric oxide film layer on a surface of a valve metal;
   forming a solid electrolyte layer on a surface of the dielectric oxide film layer; and
   forming a cathode layer, which includes a silver layer, on a surface of the solid electrolyte layer,
   wherein the silver layer is formed with silver paste, the silver paste includes silver particles and at least one of phenolic novolak type epoxy resin represented by formula (1) and trishydroxyphenylmethane type epoxy resin represented by formula (2), and not less than 90 wt. % of the silver particles are occupied by flaky silver particles, which accounts for not less than 50 vol. % and not greater than 90 vol. % in the silver layer.

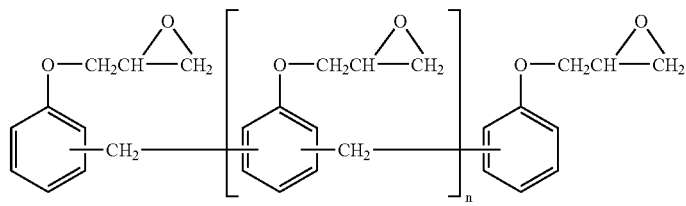

(1)

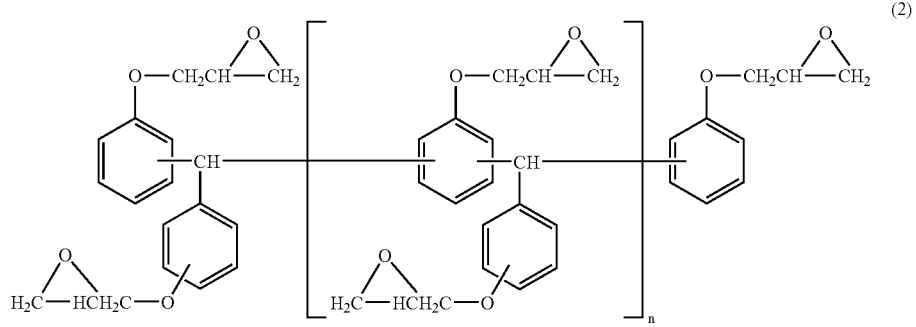

(2)

6. The process of claim 5, wherein a particle diameter of the flaky silver particles is not less than 0.1 μm and not greater than 30 μm, and a longitudinal length of a flat section of one of the flaky particles is not shorter than 2 times and not longer than 10 times of a thickness of the flat section of one of the flaky silver particles.

7. The process of claim 5, wherein in the step of forming the cathode layer, the silver paste undergoes heat treatment at a temperature of not lower than 180° C., and not higher than 230° C., and a curing stress of the silver layer is not smaller 50 kg/cm$^2$ and not greater than 300 kg/cm$^2$.

* * * * *